April 7, 1959  H. A. ELION  2,881,336
DAMPING MEANS FOR PIEZO-ELECTRIC CRYSTALS
Filed May 4, 1956

United States Patent Office 2,881,336
Patented Apr. 7, 1959

2,881,336

DAMPING MEANS FOR PIEZO-ELECTRIC CRYSTALS

Herbert A. Elion, Danbury, Conn., assignor to Sperry Products, Inc., Danbury, Conn., a corporation of New York Application May 4, 1956, Serial No. 582,680

8 Claims. (Cl. 310—8.2)

This invention relates to a method and means for damping the vibrations of a piezoelectric crystal. As is well known, when such a crystal is vibrated mechanically by the application thereto of a high frequency electrical pulse, it is frequently desirable that the crystal be damped quickly in order to obtain a short duration pulse of mechanical vibrations. Such a short duration pulse is particularly useful in inspection of materials by the reflection or echo method wherein the time interval between transmission of the pulse and reception of the pulse is measured as a function of the distance of the defect below the entering surface of the object. The shorter the pulse, the closer to the surface such testing can be effected because it is essential that the transmitted pulse terminate before the reflections arrive at the point of transmission. In order to effect this result, various backing materials have been applied to the rear surface of the crystal to effect damping, the degree of damping being a function of the acoustic impedance of the backing material.

It is one of the principal objects of this invention to provide a method and means for damping diezoelectric crystals in a manner which will permit control of the degree of damping of a predetermined range, and to do so without the use of moving parts, electric components, or additional energy sources.

It is a further object of the invention to provide controlled damping over a predetermined range by means which will eliminate the interface between the crystal and backing, and between the crystal backing and the search unit casing in order to reduce internal sound reflections which would interfere with the normal operation of the crystal in transmitting and receiving vibrations.

Further objects and advantages of this invention will become apparent in the following detailed description thereof.

In the accompanying drawing.

Figure 1:
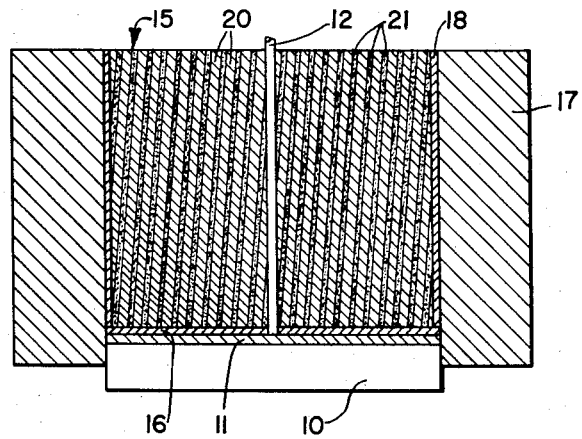
Fig. 1 is a vertical section through a search unit comprising a piezoelectric element, a damping backing therefor, and a casing for enclosing the crystal and backing.

Referring to the drawings, there is disclosed a search unit comprising a piezoelectric element 10 which may be in the form of a quartz crystal having an electrically conductive backing 11 with which electrical contact is made by means of a conductor 12 so that high frequency electric oscillations may be applied to the crystal to effect high frequency mechanical vibrations of the crystal. In order to damp the vibrations of the crystal, there is provided a backing indicated generally at 15 which may be cemented to the conductive material 11 by a suitable cement 16. The crystal and its backing may be enclosed within a holder 17 which is cemented in place by a cement layer 18.

Figure 2:
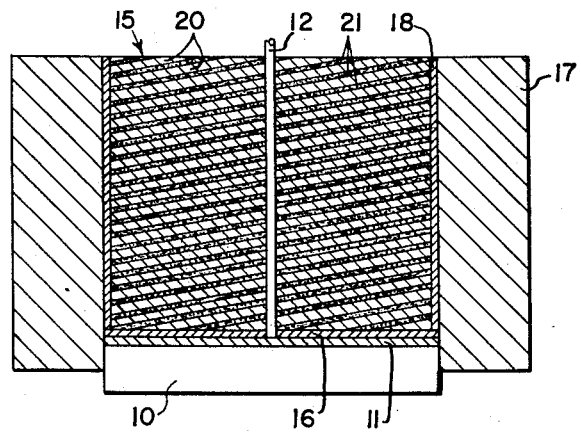
Fig. 2 is a view similar to Fig. 1 showing a different setting of materials in the backing whereby a variation in damping is effected.

The unique backing for the crystal 10 which is here employed and which permits preselection of any one of a plurality of acoustic impedances in order to vary the degree of damping, consists in embedding in a homogeneous, isotropic material, such as an epoxy resin 20, a plurality of fibers 21. The number of fibers and the diameter thereof which are embedded in the epoxy resin will determine the density which is one factor of the acoustic impedance which is a product of the density multiplied by the acoustic velocity of the composition. The second factor is the orientation of the fibers. It is the second factor which is capable of variation by this construction in order to vary the acoustic impedance and therefore in order to vary damping. The fibers 21 are of such length that they can be oriented within the resinous mass 20 anywhere between vertical and horizontal positions in order to vary the acoustic velocity which is a function of the angular positions of the fibers. Thus the fibers are shown in Fig. 1 as approaching the vertical position and in Fig. 2 as approaching the horizontal position. Any position between vertical and horizontal may be effected by this method and therefore, any one of a large number of acoustic impedances may be obtained as desired to yield the desired degree of damping.

The resin may be an epoxy casting resin such as Shell Epon No. 828 or Ciba Company, Inc., Araldite KD–133 with suitable hardener. The epoxy resin has the following properties: high acoustic attenuation, low noise, high acoustic impedance for a plastic, room temperature setting, low dimensional change on setting, high chemical attack resistance, good bonding, low water absorption, high electrical breakdown voltage, good mechanical properties in cast condition, and reasonable working pot-life to permit it to be formed. The fibers which in the drawings are shown of substantial diameter for illustrative purposes, are actually fine fiber solids of glass or a denser material such as tungsten wire. Woven or linearly arrayed fibers are cast into the plastic. The diameter of the fiber contributes considerably to the maximum amount of solid that can be embedded in the resin. The fibers are so chosen as to give the maximum amount of impedance with a minimum of acoustic noise.

The casing 17 as well as the cement surfaces 16 and 18 may be of epoxy resin corresponding to the epoxy resin material of the backing so that interfaces are eliminated and internal reflections reduced.

Having described my invention, what I claim and desire to secure by Letters Patent is:

1. A backing for a piezoelectric element having a front surface and a rear surface, comprising a homogeneous, isotropic material engaging the rear surface of the element, and a plurality of similarly oriented fibers embedded in the material.

2. A backing for a piezoelectric element as specified in claim 1, in which the homogeneous, isotropic material is a resin.

3. A backing for a piezoelectric element having a front surface and a rear surface, comprising an epoxy resin engaging the rear surface of the element, and a plurality of similarly oriented fibers embedded in the resin.

4. A backing for a piezoelectric element having a front surface and a rear surface, comprising an epoxy resin engaging the rear surface of the element, and a plurality of similarly oriented fibers of solid material having at least the density of glass embedded in the resin.

5. A backing for a piezoelectric element having a front surface and a rear surface, comprising a mass of homogeneous, isotropic material, a plurality of similarly oriented fibers embedded in said material, and a layer of the same material as said mass for binding the mass to the rear surface of the element.

6. A backing for a piezoelectric element as specified in claim 5, in which the material of said mass and said layer is an epoxy resin.

7. A piezoelectric search unit comprising a piezoelectric element having a front surface and a rear surface, a backing for said element, said backing comprising a mass of homogeneous, isotropic material, a plurality of similarly oriented fibers embedded in said mass, and a layer of the same material as said mass for binding the mass to the rear surface of the element, a holder for the element and its backing, and a layer of the same material as said mass for binding the element and its backing in said holder.

8. A piezoelectric search unit as specified in claim 7, in which the material of said mass and said layers is an epoxy resin.

References Cited in the file of this patent

UNITED STATES PATENTS

| | | |
|---|---|---|
| 2,416,337 | Mason | Feb. 25, 1947 |
| 2,511,624 | D'Halloy | June 13, 1950 |
| 2,589,403 | Kurie | Mar. 18, 1952 |
| 2,707,755 | Hardie | May 3, 1955 |

OTHER REFERENCES

C. Zwikker and C. W. Kosten: "Sound Absorbing Materials," 1949, pages 20–23, Elsevier Publishing Company, Inc., New York, Patent Office Library, QC 233 Z9.

Epoxide Resins, "Research," vol. 7, 1954, pages 351–355.

"Typical Application of Epoxy Resins," Rubber and Plastic Age, February 1954, pages 84–87.

"Alloying With Epoxies," Modern Plastics, September 1954, pages 155–157, 240–243.